(12) United States Patent
Hasegawa et al.

(10) Patent No.: US 9,531,012 B2
(45) Date of Patent: Dec. 27, 2016

(54) GAS DIFFUSION LAYER WITH FLOWPATHS

(71) Applicant: Nissan Motor Co., Ltd., Yokohama-shi, Kanagawa (JP)

(72) Inventors: Takuya Hasegawa, Yokohama (JP); Hisao Terasaki, Takatsuki (JP)

(73) Assignee: Nissan Motor Co., Ltd., Yokohama (JP)

( * ) Notice: Subject to any disclaimer, the term of this patent is extended or adjusted under 35 U.S.C. 154(b) by 195 days.

(21) Appl. No.: 14/381,232

(22) PCT Filed: Mar. 7, 2013

(86) PCT No.: PCT/JP2013/056300
§ 371 (c)(1),
(2) Date: Aug. 27, 2014

(87) PCT Pub. No.: WO2013/137102
PCT Pub. Date: Sep. 19, 2013

(65) Prior Publication Data
US 2015/0118595 A1  Apr. 30, 2015

(30) Foreign Application Priority Data

Mar. 14, 2012 (JP) ................. 2012-057407

(51) Int. Cl.
*H01M 8/02* (2016.01)
*H01M 8/10* (2016.01)
*H01M 4/86* (2006.01)
*H01M 8/04* (2016.01)

(52) U.S. Cl.
CPC .......... *H01M 4/8626* (2013.01); *H01M 8/026* (2013.01); *H01M 8/0245* (2013.01); *H01M 8/0247* (2013.01); *H01M 4/8605* (2013.01); *H01M 8/04291* (2013.01);
(Continued)

(58) Field of Classification Search
CPC .. H01M 8/1002; H01M 8/026; H01M 8/0247; H01M 8/0245; H01M 8/04291; H01M 4/8605; H01M 4/8626
See application file for complete search history.

(56) References Cited

U.S. PATENT DOCUMENTS

| 5,798,187 A | 8/1998 | Wilson et al. |
| 6,037,072 A * | 3/2000 | Wilson ................ H01M 8/0206 429/465 |

(Continued)

FOREIGN PATENT DOCUMENTS

| JP | 61-253768 A | 11/1986 |
| JP | 2009-43453 A | 2/2009 |

(Continued)

OTHER PUBLICATIONS

Machine Translation of: JP 2011/029076 A, Miyazawa et al., Feb. 10, 2011.*

*Primary Examiner* — Kenneth Douyette
(74) *Attorney, Agent, or Firm* — Global IP Counselors, LLP

(57) ABSTRACT

A gas diffusion layer with flowpaths in which electroconductive wires form flow channels disposed upon an electroconductive substrate, the flow channels formed by the electroconductive wires having a height of 300 μm or less, and flow channels formed by adjacent electroconductive wires having an equivalent diameter of 300 μm or less.

14 Claims, 4 Drawing Sheets

(52) U.S. Cl.
CPC .............. *H01M 2008/1095* (2013.01); *H01M 2300/0082* (2013.01); *Y02E 60/50* (2013.01)

(56) References Cited

U.S. PATENT DOCUMENTS

| | | | | |
|---|---|---|---|---|
| 2002/0081475 | A1* | 6/2002 | Simpkins | H01M 8/02 429/465 |
| 2003/0232234 | A1* | 12/2003 | Cisar | H01M 8/0206 429/437 |
| 2007/0065712 | A1* | 3/2007 | Wada | B01D 39/12 429/492 |
| 2012/0100442 | A1* | 4/2012 | Bulan | C25B 11/035 429/405 |

FOREIGN PATENT DOCUMENTS

| | | |
|---|---|---|
| JP | 2009-272101 A | 11/2009 |
| JP | 2010-33970 A | 2/2010 |
| JP | 2011-029076 A | 2/2011 |

\* cited by examiner

GAS DIFFUSION LAYER WITH FLOWPATHS

CROSS-REFERENCE TO RELATED APPLICATIONS

This application is a U.S. National stage application of International Application No. PCT/JP2013/056300, filed Mar. 7, 2013, which claims priority to Japanese Patent Application No. 2012-057407 filed in Japan on Mar. 14, 2012, the contents of each of which are hereby incorporated herein by reference.

BACKGROUND

Field of the Invention

The present invention relates to a gas diffusion layer with flowpaths. In particular, the present invention relates to a gas diffusion layer with flowpaths that exhibits superior power generation capability and comprises a flow channel of low height.

Background Information

Fuel cells that are capable of operating at ambient temperature and yielding high output density have drawn attention lately as power sources for electric vehicles, stationary power sources, and the like in response to social demands and trends arising from energy- and environment-related problems. The fundamental electrode reaction product of fuel cells is water, making such cells a clean power generation system that exhibits almost no deleterious effects upon the global environment. In particular, polymer electrolyte fuel cells (PEFCs) show promise as power sources for electric vehicles due to their ability to operate at comparatively low temperatures. Polymer electrolyte fuel cells are composed of layers of multiple individual cells that serve to generate power. Each of the individual cells is provided with a membrane-electrode assembly (MEA) comprising a polymer electrolyte membrane and a pair of catalyst layers and a pair of gas diffusion layers (GDLs) sequentially formed on both sides of the membrane. The MEAs of the individual cells are electrically connected to the MEAs of adjacent individual cells via separators. The layered individual cells make up a fuel cell stack. The fuel cell stack functions as a power generation means that can be used in a variety of applications.

As discussed above, the separators in such fuel cell stacks serve to electrically connect adjacent individual cells. In addition, gas flow channels are typically provided between the surfaces of an MEA and the opposing separators. These gas flow channels serve as means for supplying fuel gas and oxidant gas to the anode and the cathode, respectively. Typically, the separators are manufactured by pressing metal plates or carving plates of graphite.

To explain the power generation mechanism of a PEFC in brief, a fuel gas (such as hydrogen gas) is supplied to the anode side of the individual cell, and an oxidant gas (such as air or oxygen) is supplied to the cathode side. This results in the electrochemical reactions represented by the following formulas occurring at the anode and the cathode, thereby generating power.

[Formula 1]

Anode reaction: $H_2 \rightarrow 2H^+ + 2e^-$ (1)

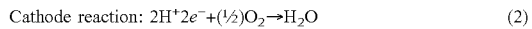

Cathode reaction: $2H^+ + 2e^- + (\frac{1}{2})O_2 \rightarrow H_2O$ (2)

The GDL requires a gas supply mechanism for efficiently diffusing and supplying the fuel gas and oxidant gas to the catalyst layers in order to bring about the electrochemical reactions described above; various such mechanisms have been proposed. For example, Japanese Laid-Open Patent Application No. 2009-272101 discloses a fuel cell in which electroconductive members (wires) for forming a specific macro space are disposed between the anode catalyst layer and a fuel supply section or the cathode catalyst layer and an oxidant supply unit so as to contact the catalyst layer and the supply section. That is, Japanese Laid-Open Patent Application No. 2009-272101 discloses forming a flow channel using electroconductive wires and rapidly expelling gas generated at the anode and water generated at the cathode through this macro space to the exterior, enabling electrical resistance to be reduced.

SUMMARY

However, because the fuel cell disclosed in Japanese Laid-Open Patent Application No. 2009-272101 does not possess a gas diffusion layer, and has electroconductive members (wires) embedded within the catalyst layer in order to reduce electrical resistance, sufficient levels of gas cannot be supplied to the catalyst layer, leading to insufficient power generation capability.

Accordingly, the present invention was conceived in view of the circumstances described above, it being an object thereof to provide a gas diffusion layer of superior power generation capability.

As the result of dedicated research into solving the problem described above, the inventors discovered that the object proposed above can be achieved by disposing electroconductive wires of a specific equivalent diameter upon an electroconductive substrate disposed on a catalyst layer in order to form a flow channel.

BRIEF DESCRIPTION OF THE DRAWINGS

Referring now to the attached drawings which form a part of this original disclosure.

DETAILED DESCRIPTION OF EMBODIMENTS

Figure 1A:
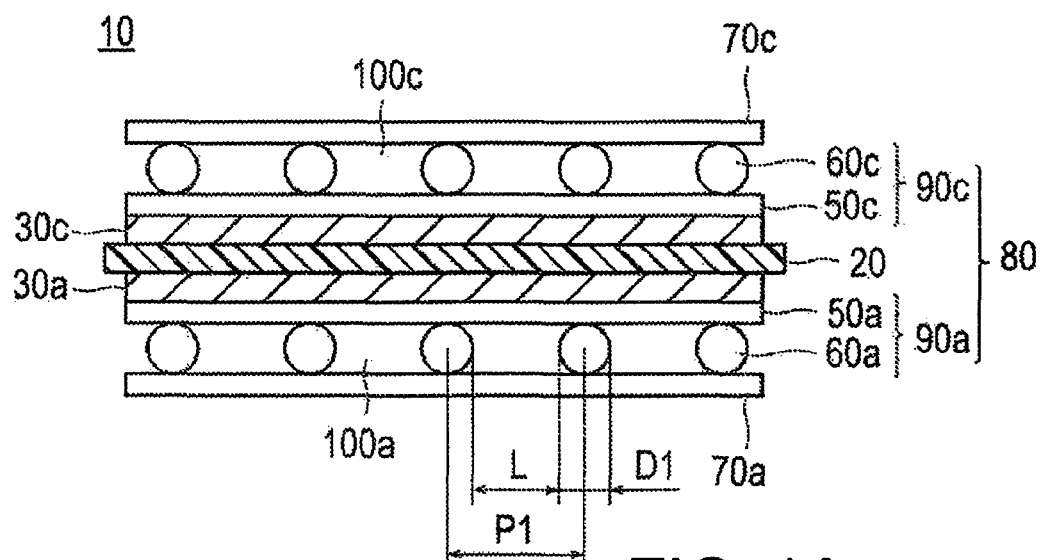
FIG. 1A is a schematic cross-sectional view of the basic configuration of a fuel cell according to a first embodiment.

The present invention relates to a gas diffusion layer with flowpaths in which electroconductive wires A for forming flow channels are disposed upon an electroconductive substrate B, the flow channels formed by the electroconductive wires A having a height of 300 µm or less, and flow channels formed by adjacent electroconductive wires A having an equivalent diameter of 300 µm or less. In this configuration, a gas flow channel is formed by the electroconductive wire, yielding superior power generation capability.

There is a demand for reductions in the size of fuel cells for the sake of ease of installation, productivity, and cost reduction, and reducing the thickness of the individual cells of the fuel cell is effective in improving volumetric output density. The individual cells of the fuel cell are generally provided with an electrolyte membrane and pairs of catalyst layers, gas diffusion layers, and gas flow channels formed sequentially on both sides of the membrane. Of these, the catalyst layers and electrolyte membrane have a thickness of 0.01-0.1 mm out of consideration for power-generating ability. The height of the gas flow channels must be 0.5-2 mm, and the thickness of the gas diffusion layers 0.2-0.5 mm. In other words, because the gas flow channels occupy the greater part of the thickness of the individual cells of the fuel cell, it is vital to reduce the height of the gas flow channels in order to reduce the size of the fuel cell. However, the gas flow channel height described above is necessary in conventional arrangements in order to efficiently remove the water produced by power generation and supply the fuel gas and oxidant gas necessary to generate power. For this reason, there is a limit to the extent to which the size of a conventional fuel cell can be reduced.

In the case of the gas diffusion layer with flowpaths described above, by contrast, a flow channel is formed by disposing electroconductive wires A in parallel upon the electroconductive substrate B. That is, the electroconductive wires A and the electroconductive substrate B serve the role of the gas flow channel part of the gas diffusion layer and separator of a conventional individual fuel cell. Because the electroconductive wires A contribute to the formation of the gas flow channel, the height of the gas flow channel can be kept low compared to a conventional separator, in which fine tooling is necessary, thereby allowing the thickness of the individual fuel cells, and thus the size of the fuel cell, to be reduced. In addition, because the diameter of the electroconductive wires A is the height of the gas flow channel, the height of the gas flow channel can be freely selected.

The ability to remove the water formed by power generation and supply the fuel gas and oxidant gas necessary to generate power can be adjusted to within an appropriate range by adjusting the pitch between adjacent electroconductive wires A. As a result, the pitch of the electroconductive wires A can be selected as appropriate in order to achieve sufficient ability to remove water formed by power generation and supply the fuel gas and oxidant gas necessary to generate power. In addition, the electroconductive wires A are disposed independently of the electroconductive substrate B in the gas diffusion layer with flowpaths described above. This affords an extremely wide range of selection—for example, the direction in which the fuel gas or oxidant gas flows can be freely selected, or different electroconductive wires A can be freely selected according to the design (wire diameter, pitch, etc.) of the electroconductive substrate B.

Additionally, if the gas diffusion layer with flowpaths described above is used to manufacture a fuel cell in particular, the fact that both the electroconductive wires A and the electroconductive substrate B are electrically conductive allows for the efficient transmission of electricity generated in the catalyst layer to the separator. Moreover, as discussed above, the gas diffusion layer with flowpaths described above is capable of exhibiting sufficient ability to remove water formed as the result of power generation and supply the fuel gas and oxidant gas necessary to generate power. A fuel cell comprising the gas diffusion layer with flowpaths described above will therefore exhibit superior power generation capability.

The fuel cell according to the present invention will now be described in detail with reference to the drawings. In the descriptions of the drawings, identical or similar parts are assigned the same reference number, and redundant description thereof will be omitted. The dimensions and proportions shown in the drawings have been exaggerated for ease of illustration; the actual proportions may differ.

There is no particular limitation upon the type of fuel cell. Specific examples include a polymer electrolyte fuel cell (PEFC), an alkaline fuel cell, a direct methanol fuel cell, a micro fuel cell, or a phosphoric acid fuel cell. Of these, a polymer electrolyte fuel cell is preferable due to its small size and potential for high density and high output. Apart from a power source for a moving object, such as an automobile, in which installation space is limited, the fuel cell is also useful as a stationary power source, but is especially advantageously usable in automotive applications, in which the system is frequently started or stopped and output variations frequently occur.

As such, the following is a description of a preferred embodiment featuring a polymer electrolyte fuel cell.

A fuel cell 10 according to the present embodiment (the first embodiment) is provided with a polymer electrolyte membrane 20, as shown in FIG. 1. A cathode catalyst layer 30c and an electroconductive, gas-blocking cathode separator 70c are provided on one side of the polymer electrolyte membrane 20. A cathode electroconductive substrate B 50c is disposed between the cathode catalyst layer 30c and the cathode separator 70c in proximity to the cathode catalyst layer 30c. A plurality of cathode electroconductive wires A 60c is disposed in parallel upon the cathode electroconductive substrate B 50c on the cathode separator 70c, forming a cathode gas diffusion layer with flowpaths 90c. The spaces between adjacent cathode electroconductive wires A 60c form gas flow channel spaces 100c for supplying oxidant gas to the cathode catalyst layer 30c. An anode catalyst layer 30a and a gas-blocking anode separator 70a that, like the cathode separator 70c, is electroconductive, are provided on the other side of the polymer electrolyte membrane 20. An anode electroconductive substrate B 50a is disposed between the anode catalyst layer 30a and the anode separator 70a in proximity to the anode catalyst layer 30a. A plurality of anode electroconductive wires A 60a constituted by electroconductive wires is disposed in parallel upon the anode electroconductive substrate B 50a on the anode separator 70a side, forming an anode gas diffusion layer with flowpaths 90a. The spaces between adjacent anode electroconductive wires A 60a forms a gas flow channel space 100a for supplying fuel gas to the anode catalyst layer 30a. Such a structure makes it possible to reduce the height of the gas flow channels while ensuring sufficient gas flow channel space, with the result that the individual cells of the fuel cell can be made to be thinner, and the fuel cell made to be more compact. Ordinarily, the separators are manufactured by pressing metal plates; however, this method leads to problems such as the separators bending during pressing or cracking or strain hardening occurring in the separators during detailed machining. By contrast, smooth separators can be used with the gas diffusion layer with flowpaths according to the present invention, obviating such problems. Moreover, in the gas diffusion layer with flowpaths according to the present invention, an electroconductive substrate B is disposed between the catalyst layer and the electroconductive wires A as a gas diffusion layer. As a result, a fuel cell formed using such a gas diffusion layer with flowpaths is capable of supplying gas throughout the entirety of the catalyst layer, including in the through-thickness direction, and exhibits superior power generation capability. With respect to the compressive force in the out-of-plane direction generated by the load applied when layering the individual cells of the fuel cell, the electroconductive substrate B minimizes and prevents the electroconductive wires A from sinking into the catalyst layer. This allows for satisfactory gas diffusion and reduces pressure loss.

When in a layered state, the polymer electrolyte membrane 20, anode catalyst layer 30a, anode electroconductive substrate B 50a, anode electroconductive wires A 60a, cathode catalyst layer 30c, cathode electroconductive substrate B 50c, and cathode electroconductive wires A 60c form a membrane electrode assembly (MEA) 80. A fuel cell stack is formed by sequentially layering a plurality of MEAs 80 with anode separators 70a and cathode separators 70c interposed therebetween. A state in which the polymer electrolyte membrane 20, anode catalyst layer 30a, and cathode catalyst layer 30c are layered together will be referred to as "CCM". Gas seals may optionally be disposed, for instance, between the separators 70a, 70c and the polymer electrolyte membrane 20 in the fuel cell stack; these are not shown in FIG. 1.

In FIG. 1, gas diffusion layer with flowpaths constituted by electroconductive wires A and an electroconductive substrate B are disposed on both the cathode and anode sides. In such a configuration, however, it is sufficient for such a layer to be applied to at least one of the anode or the cathode side. That is, a fuel cell according to a preferred embodiment comprises a membrane electrode assembly provided with an anode electrode layer and a cathode electrode layer on both sides of an electrolyte membrane, and a separator, the assembly and separator forming a layered body. A gas diffusion layer with flowpaths is disposed between the separator and the electrode layer of the membrane electrode assembly on at least one of the anode or the cathode side. In addition, the electroconductive wires A and the separators are in electrical contact, as are the electroconductive substrate B and the electrode layer of the membrane electrode assembly. This allows sufficient electrical conductivity to be ensured between the catalyst layers and the separators by the electroconductive substrate B and the electroconductive wires A, and allows electrical current generated at the cathode catalyst layer to be easily transmitted to the cathode separator. It is thereby possible to reduce the thickness of the fuel cell while ensuring sufficient gas diffusion and electrical conductivity.

Figure 1B:
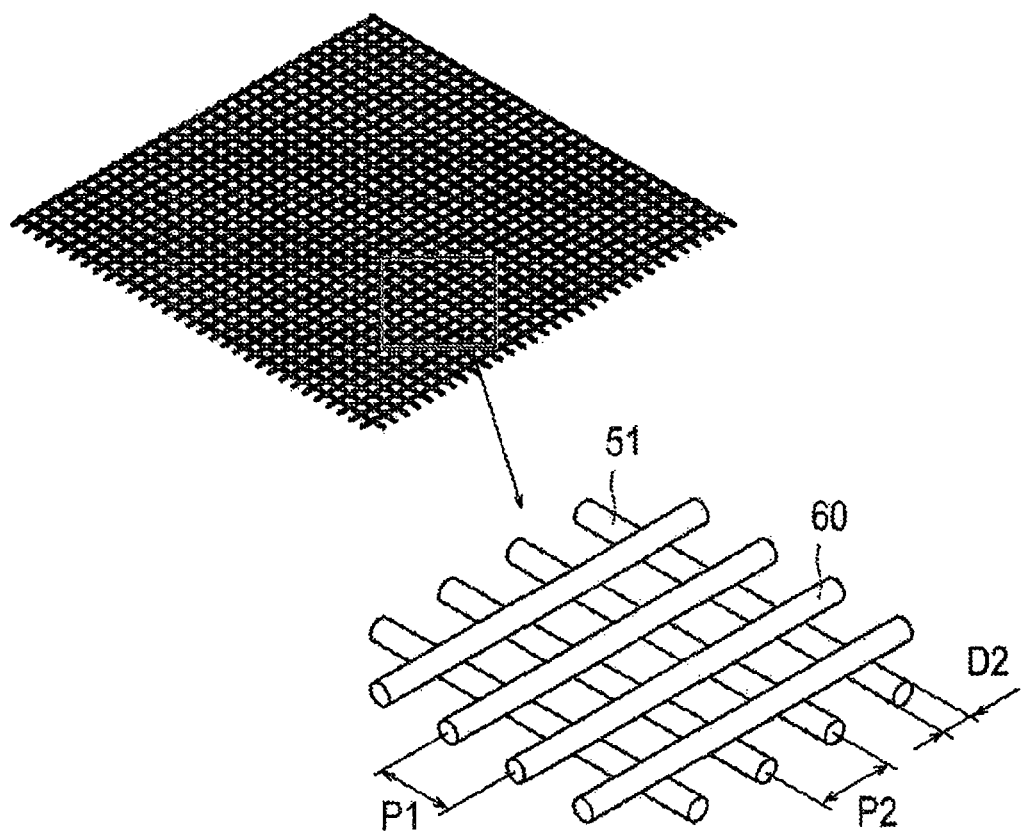
FIG. 1B is a perspective view an electroconductive substrate B and electroconductive wires A shown in FIG. 1A, and a magnified perspective view of the area surrounded by the dotted line.
Figure 2:
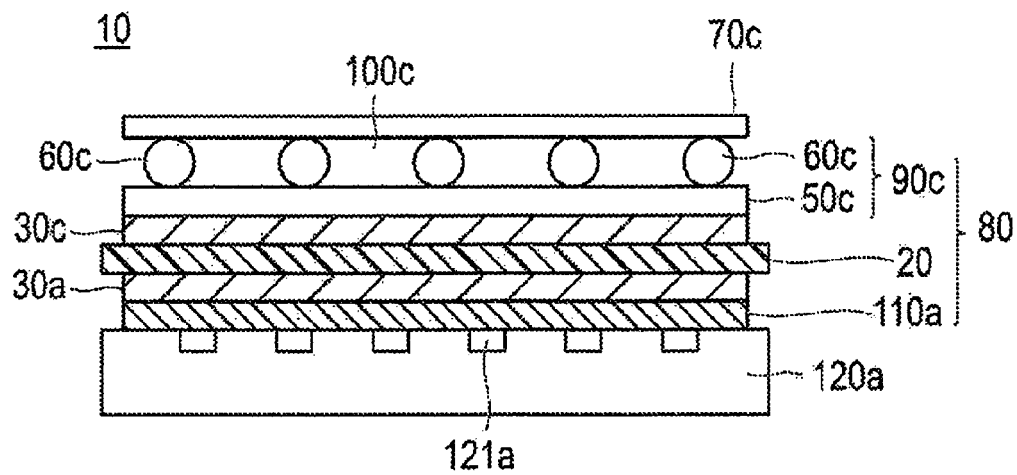
FIG. 2 is a schematic cross-sectional view of the basic configuration of a fuel cell according to a second embodiment.

An embodiment such as that shown in FIG. 2 is also possible. In the fuel cell according to the second embodiment shown in FIG. 2, the cathode electroconductive substrate B 50c is disposed in proximity to the cathode catalyst layer 30c as shown in FIG. 1 only on the cathode side. The cathode electroconductive wires A 60c are disposed between the cathode electroconductive substrate B 50c and the cathode separator 70c. An anode separator 120a provided with an anode gas diffusion layer 110a and a flow channel 121a through which fuel gas flows is disposed on the anode side, as in the case of an ordinary fuel cell. Although not shown in the drawings, a configuration that is the reverse of that shown in FIG. 2, as described hereafter, is also within the scope of the invention according to the present application. Specifically, the anode electroconductive substrate B 50a is disposed in proximity to the anode catalyst layer 30a as shown in FIG. 1 only on the anode side, and the anode electroconductive wires A 60a are disposed between the anode electroconductive substrate B 50a and the anode separator 70a. A cathode separator provided with a cathode gas diffusion layer and a flow channel through which oxidant gas flows may also be disposed on the cathode side, as in an ordinary fuel cell.

The various parts of the fuel cell 10 according to the present embodiment will now be described in detail. In the following description, the configurations of the various parts on the anode and cathode sides will be similarly defined unless otherwise noted. Thus, in the following description, the same numerical labels will be used where the parts on the anode and cathode sides are similarly configured. For example, if the cathode-side electroconductive substrate B 50c and the anode-side electroconductive substrate B 50a are similarly configured, these will both be referred to as the "electroconductive substrate B 50". The various parts may be identically or differently configured between the anode side and the cathode side.

Electroconductive Wires A

The plurality of electroconductive wires A 60 is disposed in parallel upon the electroconductive substrate B 50 to form a gas diffusion layer with flowpaths 90. The electroconductive wires A 60 directly contact the separator 70, ensuring electrical conductivity between the wires and the separator 70. The spaces between the electroconductive wires A 60 form gas flow channel spaces 100.

The electroconductive wires A 60 may be disposed at substantially overlapping positions (i.e., substantially identical positions) on the two sides of the MEA, as shown in FIG. 1, or may be disposed at different positions. For the sake of minimizing/preventing plastic deformation resulting from out-of-plane compressive force generated by the load arising from the layers, the electroconductive wires A 60 are preferably disposed at substantially overlapping positions (i.e., substantially identical positions) on the two sides of the MEA.

The height of the flow channels formed by the electroconductive wires A is 300 μm or less. Thus, the diameter of the electroconductive wires A 60 (labeled "D1" in FIG. 1A) is 300 μm or less. A diameter of 300 μm or less for the electroconductive wires A will allow the thickness of the MEA, and, by extension, the size of the fuel cell, to be reduced. In addition, because the gas supplied through the gas flow channel space can be sufficiently diffused to the area directly beneath the electroconductive wires A within the MEA, the fuel cell has superior power generation capability. Out of considerations for reducing the size of the fuel cell, removing the water formed as the result of power generation, supplying the fuel gas and oxidant gas necessary to generate power, and obtaining high output density, the diameter (D1) of the electroconductive wires A 60 is preferably 10-300 μm, more preferably 50-200 μm, and especially preferably 100-150 μm. If the electroconductive wires A have round cross-sectional shapes, the diameter (D1) of the electroconductive wires A 60 will be the diameter of the electroconductive wires constituting the electroconductive wires A. The electroconductive wires A are not limited to the round cross-sectional shape described above, and may have, for example, ellipsoid, circular, irregular, rectangular, or triangular cross sections. In such cases, the "diameter (D1) of the electroconductive wires A" is the length that defines the height of the gas flow channel spaces 100, as described above. The electroconductive wires A preferably have round or rectangular cross-sectional shapes.

The equivalent diameter of the flow channels formed by adjacent electroconductive wires A (labeled "R" in FIG. 1A) is 300 μm or less. Thus, the pitch between adjacent electroconductive wires A 60 (labeled "P1" in FIG. 1A) can be selected according to the diameter of the electroconductive wires A 60, but will be 600 μm or less. The pitch (P1) of adjacent electroconductive wires A 60 is preferably 20-600 μm, more preferably 100-400 μm, and especially preferably 200-300 μm. A pitch within this range allows sufficient levels of gas (fuel gas or oxidant gas) to be supplied to the catalyst layer 30 and ensures that a sufficient proportion of the power generation area is occupied by the flow channel, enabling gas transportation resistance to be minimized. As a result, the fuel cell is capable of demonstrating superior power generation capability. In the present description, "the pitch between adjacent electroconductive wires A 60" refers to the distance between the centers of adjacent electroconductive wires A (i.e., the length labeled "P1" in FIG. 1A). The "equivalent diameter of the flow channels formed by adjacent electroconductive wires A" refers to the distance between adjacent electroconductive wires A that substantially form gas flow channel spaces 100 (i.e., the length labeled L in FIG. 1A). The "equivalent diameter L of the flow channels formed by adjacent electroconductive wires A" is defined as the value (in μm) yielded by subtracting the diameter (D1) of the electroconductive wires A from the pitch (P1) of adjacent electroconductive wires A 60 (R (μm)=P1 (μm)−D1 (μm)).

By disposing electroconductive wires A having the diameter described above substantially in parallel at the pitch described above, it is possible to efficiently diffuse gas within the catalyst layer, ensuring sufficient gas diffusion speed and sufficient gas supply functionality. Thus, using the fuel cell according to the present embodiment promotes the electrochemical reaction, resulting in higher output. In addition, because sufficient gas diffusion speed can be ensured, water formed on the cathode side can be more easily expelled downstream in the gas diffusion direction when the arrangement described above is provided on the cathode side. It is thereby possible to sufficiently minimize flooding, the pooling of generated water in the cell. In this sense as well, the electrochemical reaction is promoted, thereby enabling higher output. Moreover, reactant gas pressure loss is reduced, creating a uniform flow rate distribution and allowing voltage to be stabilized.

In addition, it is preferable that the electroconductive substrate B 50 directly contact the catalyst layer 30, and that the electroconductive wires A 60 directly contact the separator 70. This allows sufficient electrical conductivity to be ensured between the catalyst layer 30 and the separator 70 by the electroconductive substrate B 50 and the electroconductive wires A 60, and allows electrical current generated at the cathode catalyst layer 30c to be easily transmitted to the cathode separator 70c. It is thereby possible to reduce the thickness of the fuel cell while ensuring sufficient gas diffusion and electrical conductivity.

There is no particular limitation upon the manner in which the electroconductive wires A 60 are disposed, but it is preferable that the electroconductive wires A 60 be disposed in parallel so as to be parallel to the gas flow direction. That is, it is preferable that the electroconductive wires A be disposed so as to be parallel to the direction in which gas flows within the fuel cell (individual cells). This allows an identical flow channel design to be used on the anode and cathode sides, and pressure loss to be reduced.

There is no particular upon the electroconductive material constituting the electroconductive wires A 60. Specifically, it is preferable that the electroconductive wires A 60 be constituted by a non-electroconductive core material and an electroconductive surface layer material coating the non-electroconductive core material, or by an electroconductive metal.

There is no particular limitation upon the core material used in the former case; examples include resin materials such as polyalkylene resins, including polyester resins (for example, polyethylene terephthalate), polyethylene resins, and polypropylene resins; epoxy resins; urethane resins; polycarbonate resins; acrylic resins; vinyl chloride resin; polyamide resins; and the like. These may be used singly or in combinations of two or more types.

There is no particular limitation upon the electroconductive surface layer material used to coat the core material as long as it is electrically conductive. Specific examples include metals such as gold, platinum, ruthenium, iridium, rhodium, palladium, silver, steel, iron, titanium, aluminum, and alloys of these; electroconductive polymer materials; and electroconductive carbonaceous materials such as diamond-like carbon (DLC). These may be used singly or in combinations of two or more types.

There is no particular limit on the metal used in the latter case; the metals listed above as examples of electroconductive surface layer materials for covering the core material can similarly be preferably used.

Gold and palladium exhibit superior corrosion minimizing/preventing effects. For this reason, it is preferable to form the electroconductive wires A 60 by coating a non-electroconductive core material with a metal (especially gold or palladium) or to form the electroconductive wires A 60 from gold or palladium, as this will make it possible to minimize/prevent corrosion and increase the durability of the cell. Of the options given above, it is preferable that the electroconductive wires A 60 be constituted by a non-electroconductive core material and an electroconductive surface layer material coating the non-electroconductive core material. Manufacturing the centers of the electroconductive wires A using a non-electroconductive core material allows the overall weight of the gas diffusion layer with flowpaths to be reduced, as well as costs.

Alternatively, an electroconductive anti-corrosion treatment may be separately applied to the surfaces of the electroconductive wires A 60. Applying an electroconductive anti-corrosion treatment minimizes/prevents corrosion of the electroconductive wires A 60, allowing the durability of the cell to be increased. A known means, such as plating, cladding, or sputtering with a noble metal such as gold or platinum, or coating (via sputtering, chemical vapor deposition (CVD), or physical vapor deposition (PVD)) with an electroconductive carbonaceous material such as diamond-like carbon (DLC), can be advantageously applied as an electroconductive anti-corrosion treatment. The anti-corrosion treatment may be applied to the electroconductive wires A, to the electroconductive substrate B, or after disposing the electroconductive wires A upon the electroconductive substrate B. For the sake of reducing electrical resistance, it is preferable to apply the anti-corrosion treatment after disposing the electroconductive wires A upon the electroconductive substrate B.

Electroconductive Substrate B

The plurality of electroconductive wires A is disposed in parallel upon the electroconductive substrate B 50 to form the gas diffusion layer with flowpaths 90. The gas diffusion layer with flowpaths according to the present invention is electrically conductive in the perpendicular direction. For this reason, the electroconductive wires A preferably contact and are anchored upon the electroconductive substrate B 50.

There is no particular limitation upon the electroconductive substrate B 50 as long as it is electrically conductive. The electroconductive substrate B is preferably formed from at least one layer of electroconductive wires C that are orthogonal to but not interwoven with the electroconductive wires A, or from a nonwoven or an optionally porous foam. The electroconductive substrate B is more preferably formed from at least one layer of electroconductive wires C that are orthogonal to but not interwoven with the electroconductive wires A. This will allow the fuel cell to be made more compact.

Figure 6:
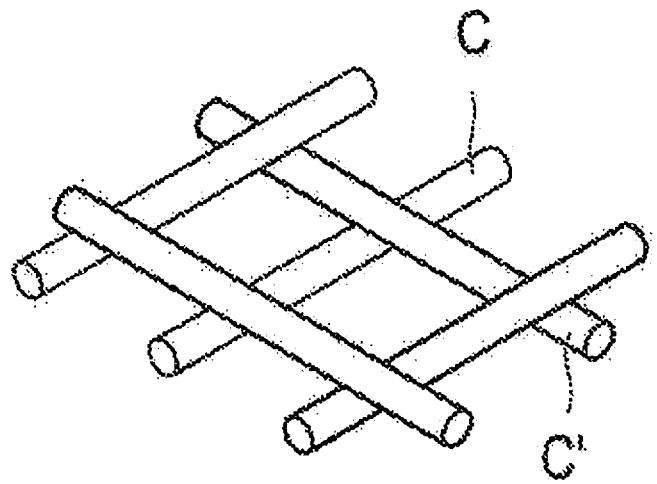
FIG. 6 is a schematic perspective view of an electroconductive substrate B according to another embodiment.

If the electroconductive substrate B 50 is formed from at least one layer of electroconductive wires C that are orthogonal to but not interwoven with the electroconductive wires A, the electroconductive substrate B may optionally further comprise electroconductive wires C' that are not interwoven with the electroconductive wires A but are interwoven with the electroconductive wires C, as shown in FIG. 6. Adopting such a configuration increases the strength of the electroconductive substrate B 50, thereby allowing plastic deformation due to out-of-plane compressive force arising from the load caused by the layers of the stack to be minimized/prevented.

Figure 7:
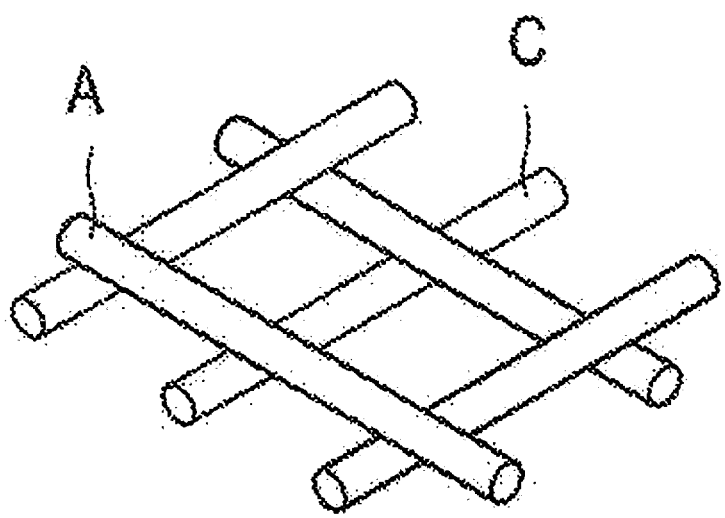
FIG. 7 is a schematic perspective view illustrating the configuration of an electroconductive substrate B.

In the present context, "the electroconductive substrate B is formed from at least one layer of electroconductive wires C that are orthogonal to but not interwoven with the electroconductive wires A" signifies a configuration such as that shown in FIG. 1B. Specifically, in the electroconductive substrate B 50, a plurality of electroconductive wires C 51 is disposed in parallel in a single layer, the individual electroconductive wires C 51 are orthogonal to the electroconductive wires A 60 but are not interwoven with them (i.e., the electroconductive wires A 60 are simply laid upon the electroconductive wires C 51). Meanwhile, "the electroconductive wires C are orthogonal to and are interwoven with the electroconductive wires A" means that the electroconductive wires C (labeled "C" in the drawings) both are orthogonal to and are interwoven with the electroconductive wires A, as shown in FIG. 7. The electroconductive substrate B 50 may be formed from a single layer of electroconductive wires C that are orthogonal to but not interwoven with the electroconductive wires A, or from two or more such layers in a layered state. For the sake of reducing the thickness of the MEA (i.e., the size of the fuel cell), the electroconductive substrate B 50 is preferably formed from a single layer of electroconductive wires C that are orthogonal to but not interwoven with the electroconductive wires A.

In the present embodiment, there is no particular limitation upon the diameter of the electroconductive wires C 51 (labeled "D2" in FIG. 1B). For the sake of minimizing/preventing plastic deformation resulting from out-of-plane compressive force generated by the load arising from the layers, reducing the size of the fuel cell, removing the water produced by generating power, and supplying the fuel gas and oxidant gas necessary to produce power, the diameter is preferably 300 μm. A diameter (D2) of 300 μm or less for the electroconductive substrate B will allow the thickness of the MEA, and, by extension, the size of the fuel cell, to be reduced. In addition, because the gas supplied through the gas flow channel space can be sufficiently diffused to the area directly beneath the electroconductive substrate B within the MEA, the fuel cell has superior power generation capability. The diameter (D2) of the electroconductive wires C 51 is more preferably 10-300 μm, and especially preferably 30-150 μm. A diameter in this range allows plastic deformation resulting from out-of-plane compressive force generated by the load arising from the layers to be minimized/prevented, the size of the fuel cell to be reduced, and the ability to remove water produced by power generation, the ability to supply the fuel gas and oxidant gas necessary to generate power, and increased output density to be achieved. If the electroconductive wires C have round cross-sectional shapes, the diameter (D2) of the electroconductive wires C will be the diameter of the electroconductive wire constituting the electroconductive wires C. The electroconductive wires C are not limited to the round cross-sectional shape described above, and may have, for example, ellipsoid, circular, irregular, rectangular, or triangular cross sections. In such cases, the "diameter (D2) of the electroconductive wires C" is the length that defines the total height of the electroconductive wires C with respect to the through-thickness direction of the MEA. The electroconductive substrate B preferably has a round or rectangular cross-sectional shape.

It is also preferable that the pitch (P2) of adjacent electroconductive wires C 51 be less than the pitch (P1) of adjacent electroconductive wires A (P2<P1). In such cases, the electroconductive wires C 51 are disposed in parallel at a small pitch (i.e., densely), allowing for the efficient transmission of electricity generated at the catalyst layer 30 to the separator 70. Meanwhile, because the electroconductive wires A are disposed in parallel at a pitch of a certain size (greater than that of the electroconductive wires C 51), a satisfactory flow of gas from the separator can be ensured. Specifically, the ratio (P2/P1) of the pitch (P2) of adjacent electroconductive wires C 51 to the pitch (P1) of adjacent electroconductive wires A is preferably 0.1-0.8, more preferably 0.2-0.6.

Alternatively, if a catalyst layer is further disposed upon the electroconductive substrate B on the side thereof on which electroconductive wires A are not disposed, half the value of the pitch between adjacent electroconductive wires C may satisfy the following formula (1):

[Numerical formula 1]

$$\rho \times r/t \leq 5 \quad (1)$$

If a catalyst layer is further disposed upon the electroconductive substrate B on the side thereof on which electroconductive wires A are not disposed, the pitch between adjacent electroconductive wires C preferably satisfies formula (1) above.

In formula (1) above, r is half the value (in cm) of the pitch between adjacent electroconductive wires C. ρ is the resistance (Ω·cm) of the catalyst layer. t is the thickness (cm) of the catalyst layer. In this way, a fuel cell of low internal resistance can be formed by selecting the pitch between adjacent electroconductive wires C as appropriate according to the resistivity ρ and thickness t of the catalyst layer. The value calculated by formula (1) ρ×r/t is preferably 5 or less, more preferably 2 or less, still more preferably 1 or less, and especially preferably 0.5 or less.

By disposing electroconductive wires C having the diameter described above substantially in parallel at the pitch described above to form the electroconductive substrate B, it is possible to efficiently transmit electricity generated at the catalyst layer 30 to the separator 70. In addition, gas supplied from the separator can be efficiently supplied to the catalyst layer. As a result, in a fuel cell using the gas diffusion layer with flowpaths described above, the electrochemical reaction is promoted, resulting in higher output being achievable. In addition, the electroconductive substrate B is capable of sufficiently minimizing/preventing plastic deformation resulting from out-of-plane compressive force generated by the load arising from the layers.

There is no particular limitation upon the electroconductive material constituting the electroconductive wires C if the electroconductive substrate B 50 is formed from at least one layer of electroconductive wires C that are orthogonal to but not interwoven with the electroconductive wires A. Specifically, it is preferable that the electroconductive wires C be constituted by a non-electroconductive core material and an electroconductive surface layer material coating the non-electroconductive core material, or by a metal. There is no particular limitation upon the core material used in the former case; examples include resin materials such as polyalkylene resins, including polyester resins (for example, polyethylene terephthalate), polyethylene resins, and polypropylene resins; epoxy resins; urethane resins; polycarbonate resins; acrylic resins; vinyl chloride resin; polyamide resins; and the like. These may be used singly or in combinations of two or more types. There is no particular limitation upon the electroconductive surface layer material used to coat the core material as long as it is electrically conductive. Specific examples include metals such as gold, platinum, ruthenium, iridium, rhodium, palladium, silver, steel, iron, titanium, aluminum, and alloys of these; electroconductive polymer materials; and electroconductive carbonaceous materials. These may be used singly or in combinations of two or more types. There is no particular limit on the metal used in the latter case; the metals listed above as examples of electroconductive surface layer materials for covering the core material can similarly be preferably used. Of the above, it is especially preferable to form the electroconductive substrate B 50 by coating a non-electroconductive core material with a metal (especially gold or palladium) or to form the electroconductive wires from gold or palladium, as this will make it possible to minimize/prevent corrosion and increase the durability of the cell. Of the options given above, it is preferable that the electroconductive wires C be constituted by a non-electroconductive core material and an electroconductive surface layer material coating the non-electroconductive core material. Manufacturing the centers of the electroconductive wires C using non-electroconductive core material allows the overall weight of the gas diffusion layer with flowpaths to be reduced, as well as costs.

Alternatively, an electroconductive anti-corrosion treatment may be separately applied to the surfaces of the electroconductive substrate B or the electroconductive wires C. Applying an electroconductive anti-corrosion treatment minimizes/prevents corrosion of the electroconductive substrate B or electroconductive wires C, allowing the durability of the cell to be increased. A known means, such as plating with a noble metal such as gold or platinum, cladding, sputtering, or coating (via sputtering, chemical vapor deposition (CVD), or physical vapor deposition (PVD)) with an electroconductive carbonaceous material such as diamond-like carbon (DLC), can be advantageously applied as an electroconductive anti-corrosion treatment. The anti-corrosion treatment may be applied to the electroconductive wires A, to the electroconductive substrate B, or after disposing the electroconductive wires A upon the electroconductive substrate B. For the sake of reducing electrical resistance, it is preferable to apply the anti-corrosion treatment after disposing the electroconductive wires A upon the electroconductive substrate B.

If the electroconductive substrate B is of nonwoven or an optionally porous foam, a water-repellent or hydrophilic treatment may be applied in order to further increase water repellence and prevent flooding and the like. There is no particular limitation upon the water-repellent agent that can be used in the water repellent treatment; examples include fluorine-based polymer materials such as polytetrafluoroethylene (PTFE), polyvinylidene fluoride (PVdF), polyhexafluoropropylene, or tetrafluoroethylene-hexafluoropropylene copolymer (FEP); polypropylene; and polyethylene. There is no particular limitation upon the water repellent treatment method; the treatment can be performed using an ordinary water repellent treatment method. For example, the electroconductive substrate B can be immersed in a liquid dispersion of a water-repellent agent, then heated and dried in an oven or the like. In particular, it is possible to use a sheet formed by impregnating a porous piece of polytetrafluoroethylene (PTFE) with carbon particles and sintering. Using a sheet simplifies the manufacturing process, and allowing for easier handling and assembly when layering the various parts of the fuel cell.

There is no particular limitation upon the thickness of the electroconductive substrate B. For the sake of minimizing/preventing plastic deformation resulting from out-of-plane compressive force generated by the load arising from the layers and reducing the size of the fuel cell, the thickness of the electroconductive substrate B is preferably 300 μm or less, more preferably 5-200 μm, and especially preferably 10-100 μm.

(Method of Manufacturing Gas Diffusion Layer with Flowpaths)

There is no particular limitation upon the method used to manufacture the gas diffusion layer with flowpaths, as long as flow channel-forming electroconductive wires A are disposed in parallel on the electroconductive substrate B. The following description features a preferred embodiment for an instance in which the electroconductive substrate B is formed from one layer of electroconductive wires C that are orthogonal to but not interwoven with the electroconductive wires A, but the present invention is not limited to the method described below. A similar or appropriately modified method can also be applied for an electroconductive substrate B according to another embodiment.

For example, the electroconductive wires C may be disposed in parallel at a suitable pitch to form an electroconductive substrate B, after which the electroconductive wires A 60 may be disposed without modification upon the electroconductive substrate B or anchored to the electroconductive substrate B; the latter method is preferable. Such an arrangement allows gas to be supplied uniformly, and makes it possible to minimize/prevent shifting of the electroconductive wires A during assembly, as well as shifting of the electroconductive wires A due to changes in surface pressure or gas pressure during operation. Anchoring the electroconductive wires A 60 to the electroconductive substrate B 50 allows the bending rigidity of the electroconductive substrate B to be improved.

There is no particular limitation upon the method used to anchor the electroconductive wires A to the electroconductive substrate B (electroconductive wires C). For example, if the electroconductive wires A are formed from a resin or metal, heat bonding or the like can be used. There is no particular method upon the method of heat bonding employed; for example, the contact points between the electroconductive substrate B and the electroconductive wires A can be anchored in place via welding, sintering, deposition, or the like. Using heat bonding ensure electrical conductivity even if there are locations where there is no contact or no surface pressure upon the electroconductive substrate B and the electroconductive wires A. Heat bonding is also advantageous in terms of ease of operation and the like.

Alternatively, if the electroconductive wires A and C are formed by coating a non-electroconductive core material with an electroconductive surface layer material, a method such as the following is preferably used. "Specifically, the non-electroconductive core material sections of the electroconductive wires C are first arranged in rows at a suitable pitch to form a substrate B', after which the non-electroconductive core material sections (wires A') of the electroconductive wires A are arrayed in parallel rows on the substrate B' so as to be orthogonal to but not interwoven with the wires C, thereby forming a substrate B' with wires A' (step (a)). The substrate B' with wires A' is then coated with an electroconductive surface layer material (step (b)), thereby producing a gas diffusion layer with flowpaths in which flow channel-forming electroconductive wires A are disposed in parallel upon an electroconductive substrate B.

In step (a), the wires A' and substrate B' may be subjected to the following step (b) without further modification, but it is preferable that step (b) be performed after anchoring the wires A' to the substrate B'. Such a method allows gas to be supplied uniformly, and shifting of the electroconductive wires A during assembly, as well as shifting of the electroconductive wires A due to changes in surface pressure or gas pressure during operation, to be minimized/prevented. Anchoring the electroconductive wires A 60 to the electroconductive substrate B 50 allows the bending rigidity of the electroconductive substrate B to be improved. In addition, even if the electroconductive wires A 60 are not straight, anchoring the points of contact with the electroconductive substrate B allows the in-plane bending rigidity of the electroconductive substrate B in both the lateral and longitudinal directions to be improved. There is no particular limitation upon the method used to anchor the wires A' to the substrate B'. If, for example, the wires A' and the substrate B' are made of a resin material such as those listed above, it is possible to arrange the wires A' in parallel rows on the substrate B' in step (a) so as to be orthogonal thereto but not interwoven therewith, followed by bonding the wires by heating to a temperature equal to or greater than the melting point of the resin material. In such cases, because the substrate B' and the wires A' are fused together, the thickness of the gas diffusion layer with flowpaths is slightly less than the total of the sizes (or the total of the diameters if the wires A and C are round) of the substrate B' and the wires A'. Similarly, the sizes of the wires A' and the wires C' (or the diameters thereof if the wires A' and C' are round) are slightly less than the sizes of the electroconductive wires A and the electroconductive wires C (or the diameters thereof if the electroconductive wires A and C are round).

In step (b), there is no particular limitation upon the method of forming the coating using the electroconductive surface layer material of the substrate B' with wires A'. Specific examples include bonding together thin films of electroconductive surface layer material or plating (metal plating) using an electroconductive surface layer material.

It is especially preferable to arrange the non-electroconductive core material sections of the electroconductive wires C in rows to form a substrate B', followed by arranging the wires A' in parallel rows on the substrate B' so as to be orthogonal thereto but not interwoven therewith, thereby forming a non-electroconductive substrate B' with wires A'. The substrate B' with wires A' is then plated with a metal (especially gold or palladium). In this method, the centers of the electroconductive wires A and C are manufactured using a non-electroconductive core material, allowing the overall weight of the gas diffusion layer with flowpaths to be reduced, as well as costs.

In the gas diffusion layer with flowpaths according to the present invention, the penetrative resistance (electrical resistance) in the through-thickness direction (i.e., the through-thickness direction of the fuel cell) is 30 $\Omega/cm^2$ or less, and the electroconductive substrate B has a Gurley density of 300 seconds or less. The penetrative resistance and Gurley density can be defined by the pitch between adjacent electroconductive wires C 51. That is, the pitch of adjacent electroconductive wires C 51 (labeled "P2" in FIG. 1B) is 480 μm or less, preferably 5-480 μm, more preferably 20-300 μm, and especially preferably 30-150 μm. A pitch in this range allows the thickness of the MEA, and, by extension, the size of the fuel cell, to be reduced. In addition, electricity generated at the catalyst layer 30 can be efficiently transmitted to the separator 70. As a result, the fuel cell is capable of demonstrating superior power generation capability. Moreover, because adjacent electroconductive wires C are densely disposed, plastic deformation resulting from out-of-plane compressive force generated by the load arising from the layers can be sufficiently minimized/prevented. In the present description, "the pitch between adjacent electroconductive wires C 51" refers to the distance between the centers of adjacent electroconductive wires C (labeled "P2" in FIG. 1B). In the present description, "Gurley density" is the number of seconds necessary for 100 cc of air to pass through at a pressure of 0.879 $g/mm^2$ in accordance with JIS P 8117 (1998 ed.).

There is no particular limitation upon the thickness of the gas diffusion layer with flowpaths. However, for the sake of minimizing/preventing plastic deformation resulting from out-of-plane compressive force generated by the load arising from the layers, reducing the size of the fuel cell, removing the water produced by generating power, supplying the fuel gas and oxidant gas necessary to produce power, and increasing output density, the thickness is preferably 55-600 μm. The thickness is more preferably 100-350 μm.

There is also no particular limitation upon the size of the gas diffusion layer with flowpaths. Defining L as the length in the direction parallel to the electroconductive wires A and W as the length in the direction perpendicular to the electroconductive wires A, the gas diffusion layer with flowpaths preferably has a rectangular shape such that the ratio L/W is 2 or less. Such a configuration allows gas (fuel gas or oxidant gas) to be efficiently distributed to the separator. The ratio L/W is more preferably 0.05-2, still more preferably 0.1-1.5, and especially preferably 0.2-1.2.

Figure 3:
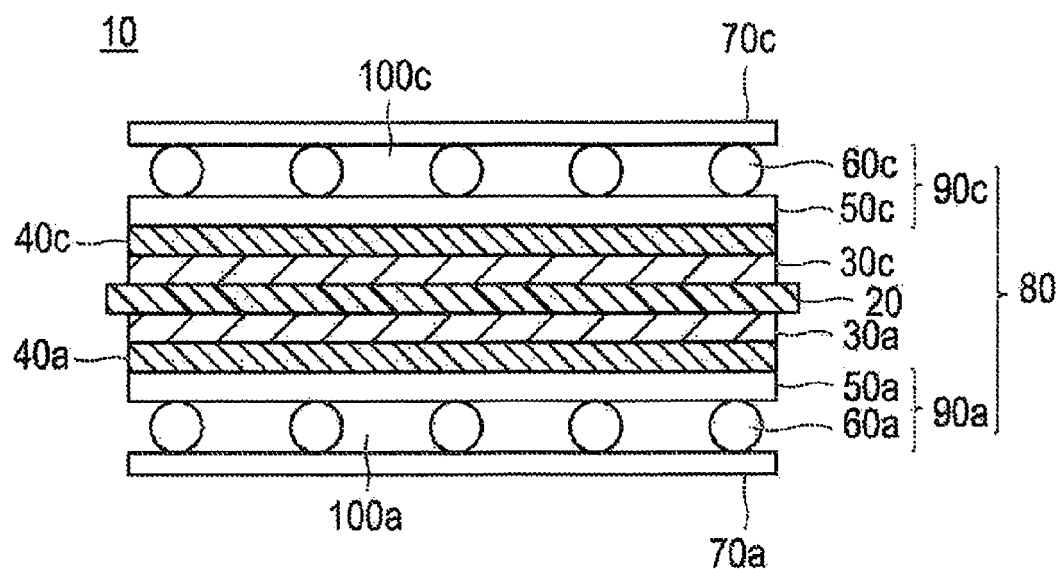
FIG. 3 is a schematic cross-sectional view of the basic configuration of a fuel cell according to a third embodiment.

The gas diffusion layer with flowpaths 90 comprises the electroconductive substrate B 50c and electroconductive wires A 60c or the electroconductive substrate B 50a and electroconductive wire A 60a as essential elements. In addition to the constituent parts listed above, an electroconductive particle layer 40 may optionally be formed on the electroconductive substrate B 50 on a side thereof on which the electroconductive wires A 60 are not disposed, as shown in FIG. 3 (illustrating a fuel cell according to a third embodiment). Providing an electroconductive particle layer 40 in this way increases the closeness of the bond between the catalyst layer 30 and the electroconductive substrate B 50, thereby reducing the contact resistance between the MEA 80 and the electroconductive substrate B 50, and allowing in-plane electrical conductivity within the MEA 80 to be increased and current collection performance to be improved. As a result, if the electroconductive substrate B 50 is formed from at least one layer of electroconductive wires C that are orthogonal to but not interwoven with the electroconductive wires A 60, a greater pitch can be set between the electroconductive wires C. Water collecting in the electroconductive substrate B 50 can also be more easily expelled. In addition, the electroconductive particle layer 40 functions as a protective layer, allowing direct contact between the electroconductive substrate B 50 and the MEA 80 to be avoided and the corrosion resistance of the electroconductive substrate B 50 to be improved, as well as damage to the catalyst layer 30 due to pressure from the electroconductive substrate B 50 to be avoided. There is no particular limitation upon the method used to form the electroconductive particle layer 40; for example, the electroconductive particle layer 40 can be compression bonded upon the catalyst layer 30.

In FIG. 3, both a cathode electrically conductive microparticle layer 40c and an anode electrically conductive microparticle layer 40a are provided, but it is also acceptable to provide only one of these. The embodiment shown in FIG. 3 corresponds to the embodiment shown in FIG. 1, but may also be applied to another embodiment.

The electroconductive particle layer 40 is constituted by an aggregate of carbon particles containing, as necessary, a water-repellent agent. There is no particular limitation upon the carbon particles; any type ordinarily used in the art, such as carbon black, graphite, or exfoliated graphite, is acceptable. Preferable examples include various types of carbon black, such as oil furnace black, channel black, lamp black, thermal black, and acetylene black, due to their superior electron conductivity and high specific surface area. The diameter of the carbon particles may be roughly 10-100 µm. This allows for high levels of water drainage via capillary action, and makes it possible to improve contact with the catalyst layer. There is no particular limitation upon the water-repellent agent that can be used in the carbon particle layer; examples include fluorine-based polymer materials such as polytetrafluoroethylene (PTFE), polyvinylidene fluoride (PVdF), polyhexafluoropropylene, or tetrafluoro-ethylene-hexafluoropropylene copolymer (FEP); polypropylene; and polyethylene. Of these, fluorine-based polymer materials are preferable for their water repellency and corrosion resistance during electrode reactions. Regarding the proportions of carbon particles and water-repellent agent in the carbon particle layer, too high a proportion of carbon particles may make it impossible to obtain the expected level of water repellence, and too high a proportion of water-repellent agent may make it impossible to obtain sufficient electron conductivity. As such, the proportions of carbon particles and water-repellent agent in the carbon particle layer should be roughly 90:10 to 40:60 by mass. The thickness of the carbon particle layer may be determined as appropriate according to the water repellence of the obtained gas diffusion layer. The carbon particle layer can be manufactured by impregnating porous polytetrafluoroethylene (PTFE) with an aqueous dispersion containing acetylene black, PTFE microparticles, and a thickening agent, then firing.

Separator

The separator 70 serves to electrically connect the cells in series when a plurality of individual cells are connected in series to form a fuel cell stack. The separator 70 also serves as a barrier that isolates the fuel gas, oxidant gas, and coolant from each other. A known material, such as carbon in the form of fine carbon graphite or carbon plates or a metal such as stainless steel, may be used as appropriate as the constituent material of the separator 70. In the present embodiment, the anode separator 70a and the cathode separator 70c are both made of carbon.

There is no particular limitation upon the separator 120a shown in FIG. 2; a separator ordinarily used in fuel cells can be used in a similar manner. The separator 120a is provided with groove-shaped electroconductive wires A 121a that form flow channels through which gas flows. However, because sufficient gas-supplying functionality can be obtained from the electroconductive wires A 60 or the electroconductive substrate B 50, it is not necessary to form electroconductive wires A 121a in the separator 70, as are formed in conventional separators. This allows the separator 70 to be simply and inexpensively manufactured. Specifically, if the separator 120a is made of carbon, the electroconductive wires A must be formed via carving, and, if the separator 120a is made of metal, the electroconductive wires A must be formed via pressing. However, because there is no need to form groove-shaped electroconductive wires A 121a in the separator 70 of the present embodiment, costs can be reduced. In addition, because there is no need to form groove-shaped electroconductive wires A 121a, the size of the separator 70 in the through-thickness direction and the size of the fuel cell 10 in the through-thickness direction can be reduced.

Polymer Electrolyte Membrane

The polymer electrolyte membrane 20 serves to selectively pass protons generated at the anode catalyst layer 30a when the fuel cell 10 is being operated in the through-thickness direction of the member to the cathode catalyst layer 30c. The polymer electrolyte membrane 20 also serves as a barrier that prevents the fuel gas supplied to the anode side and the oxidant gas supplied to the cathode side from mixing.

There is no particular limitation upon the polymer electrolyte membrane 20; a membrane of a polymer electrolyte known in the art in the technical field of fuel cells can be used, as appropriate. Examples include fluorine-based polymer electrolyte membranes constituted by per fluorocarbon sulfonic acid polymers such as Nafion® (DuPont), Aciplex® (Asahi Kasei), or Flemion® (Asahi Glass); Dow Chemical ion exchange resins; fluoropolymer electrolytes such as ethylene-ethylene tetrafluoride copolymer resin membranes or trifluorostyrene-based resin membranes; sulfonic acid group-comprising hydrocarbon resin membranes; and other commercially available solid polymer electrolyte membranes, membranes of microporous polymer membranes impregnated with liquid electrolytes; and membranes of porous materials filled with polymer electrolytes. The polymer electrolyte used in the polymer electrolyte membrane and the polymer electrolyte used in the catalyst layers may be the same or different, but are preferably the same in order to improve the strength of the bond between the catalyst layers and the polymer electrolyte membrane.

The thickness of the polymer electrolyte membrane 20 may be determined as appropriate according to the properties of the obtained MEA, but is preferably 5-300 µm, more preferably 10-200 µm. The thickness is preferably at least 5 µm for the sake of strength during membrane formation and durability when the MEA is being operated, and preferably no more than 300 µm for the sake of output properties when the MEA is being operated.

In addition to the fluorine-based polymer electrolyte or sulfonic acid group-comprising hydrocarbon resin membranes listed above, a porous thin film formed from polytetrafluoroethylene (PTFE), polyvinylidene fluoride (PVDF), or the like impregnated with an electrolyte component such as phosphoric acid or an ionic liquid may be used for the polymer electrolyte membrane 20.

Catalyst Layer

The catalyst layer 30 is the layer in which the cell reaction actually takes place. Specifically, a hydrogen oxidation reaction takes place in the anode catalyst layer 30a takes place in the anode catalyst layer 30a, and an oxygen reduction reaction takes place in the cathode catalyst layer 30c. The catalyst layer contains a catalyst component, an electroconductive catalyst carrier for carrying the catalyst component, and a polymer electrolyte.

There is no particular limitation upon the catalyst component used in the cathode catalyst layer 30c as long as it is capable of catalyzing an oxygen reduction reaction; a known catalyst can be used in a similar manner. There is likewise no particular limitation upon the catalyst component used in the anode catalyst layer 30a as long as it is capable of catalyzing a hydrogen oxidation reaction; a known catalyst can be used in a similar manner. Specific examples include metals such as platinum, ruthenium, iridium, rhodium, palladium, osmium, tungsten, lead, iron, chromium, cobalt, nickel, manganese, vanadium, molybdenum, gallium, or aluminum, and alloys thereof. Of these, it is preferable that at least platinum is included in order to improve catalytic activity, resistance to catalyst poisoning by carbon monoxide or the like, and heat resistance. The composition of the alloy will vary according to the types of metals being alloyed, but should comprise 30-90% platinum atoms and 10-70% alloy metal atoms. If an alloy is used as a cathode catalyst, the composition of the alloy will vary according to the types of metal being alloyed and may be selected, as appropriate, by a person skilled in the art, but preferably comprises 30-90% platinum atoms and 10-70% alloy metal atoms. In the present context, an "alloy" is a general term for mixtures of one or more metallic or nonmetallic elements with a metallic element that exhibit metal-like properties. Examples of alloy structures include eutectic alloys in which the component elements form separate crystals, solid solutions in which the component elements have completed melted together, and alloys in which the component elements form intermetallic compounds or metal-non-metal compounds; any of these is acceptable. The catalyst component used in the cathode catalyst layer and the catalyst component used in the anode catalyst layer may be selected, as appropriate, from among those listed above. In the following description, unless otherwise noted, the catalyst components for the cathode catalyst layer and the anode catalyst layer are similarly defined, and are referred to collectively as the "catalyst component". However, the catalyst components for the cathode catalyst layer and the anode catalyst layer need not be identical, and may be selected as appropriate so as to yield the desire effects as described above.

There is no particular limitation upon the morphology and size of the catalyst component, and morphologies and sizes similar to those of known catalyst components are acceptable, but the catalyst component is preferably granular. In such cases, the average particle diameter of the catalyst particles is preferably as small as possible, as this will increase the effective electrode area over which the electrochemical reaction takes place, and thus will increase oxygen reduction activity; however, in practice, too small an average particle diameter may actually decrease oxygen reduction activity. Accordingly, the average particle diameter of the catalyst particles in the catalyst ink is preferably 1-30 nm, more preferably 1.5-20 nm, still more preferably 2-10 nm, and especially preferably 2-5 nm. The diameter is preferably at least 1 nm so that the particles can be more easily carried, and preferably no more than 30 nm for the sake of catalyst utilization rate. The "average particle diameter of the catalyst particles" can be measured using the crystallite diameter as calculated using the half-width of the diffraction peak of the catalyst component obtained via X-ray diffraction or the average particle diameter value for the catalyst component as determined from a transmission electron microscope image.

The catalyst particles are carried on the electroconductive carrier to form an electrode catalyst. Any electroconductive carrier that has a specific surface area such that the catalyst particles can be carried in the desired state of dispersion and exhibits enough electron conductivity to act as a current collector is acceptable, preferably having carbon as a main component. Specific examples include carbon particles constituted by carbon black, activated charcoal, coke, natural graphite, or artificial graphite. In the present context, "having carbon as a main component" includes having carbon atoms as a main component, and encompasses both being constituted solely by carbon and substantially by carbon. In some instances, elements other than carbon atoms may be included in order to improve the properties of the fuel cell. Being substantially constituted by carbon means that up to roughly 2-3 mass % impurities may be included.

Any BET specific surface area is acceptable for the electroconductive carrier as long as the specific surface area is sufficient for the catalyst component to be deposited at high dispersion, but the specific surface area is preferably 20-1600 m$^2$/g, more preferably 80-1200 m$^2$/g. Such a specific surface area ensures the dispersibility of the catalyst component and the polymer electrolyte upon the electroconductive carrier, allowing for sufficient power generation capability, and also ensures sufficient effective utilization of the catalyst component and the polymer electrolyte. There is no particular limitation upon the size of the electroconductive carrier, but an average particle diameter of 5-200 nm is preferable, and 10-100 nm more preferable, for the sake of ease of deposition, catalyst utilization, and keeping the thickness of the catalyst layer in a suitable range.

The amount of deposited catalyst component is preferably 10-80 mass %, more preferably 30-70 mass %, of the total mass of the electrode catalyst. Such an amount allows for satisfactory dispersion of the catalyst component upon the electroconductive carrier, ensures a certain level of catalytic activity per unit of weight, improving power generation capability, and is economically advantageous. The amount of deposited catalyst component can be determined via inductively coupled plasma (ICP) emission spectrometry.

Apart from the electrode catalyst, the catalyst layer 30 comprises a polymer electrolyte. There is no particular limitation upon the polymer electrolyte, and any known such electrolyte may be used, provided that it at least exhibit high proton conductivity. The types of polymer electrolyte that can be used can be broadly divided into fluorine-based electrolytes comprising fluorine atoms in all or part of the polymer skeletons thereof, and hydrocarbon-based electrolytes that contain no fluorine atoms in the polymer skeletons thereof. Specific preferred examples of fluorine-based electrolytes include per fluorocarbon sulfonic acid polymers such as Nafion® (DuPont), Aciplex® (Asahi Kasei), or Flemion® (Asahi Glass); polytrifluorostyrene sulfonic acid polymers; per fluorocarbon phosphonic acid polymers; trifluorostyrene sulfonic acid polymers; ethylene tetrafluoroethylene-g-styrene sulfonic acid polymers; ethylene-tetrafluoroethylene copolymers; and polyvinylidene fluoride-per fluorocarbon sulfonic acid polymers. Specific preferred examples of hydrocarbon-based electrolytes include polysulfonic acid, polyaryl ether ketone sulfonic acid, polybenzimidazole alkyl sulfonic acid, polybenzimidazole alkyl phosphonic acid, polystyrene sulfonic acid, polyether ether ketone sulfonic acid, and polyphenyl sulfonic acid. The polymer electrolyte preferably contains fluorine atoms, as this will yield superior heat resistance and chemical stability; of these, fluorine-based electrolytes such as Nafion® (DuPont), Aciplex® (Asahi Kasei), and Flemion® (Asahi Glass) are preferable.

The catalyst component may be deposited upon the electroconductive carrier according to a known method. Examples include known methods such as impregnation, liquid phase reduction deposition, vapor deposition/drying, colloid sorbent, spray pyrolysis, and reverse micelles (microemulsion). A commercially available electrode catalyst may be used.

There is no particular limitation upon the method used to manufacture the fuel cell; the known art within the field of fuel cells may be referred to as appropriate. There is also no particular limitation upon the fuel used when operating the fuel cell. Examples include hydrogen, methanol, ethanol, 1-propanol, 2-propanol, 1-butanol, 2-butanol, 3-butanol, dimethyl ether, diethyl ether, ethylene glycol, and diethylene glycol. Of these, hydrogen or methanol is preferable, as these allow for increased output.

Moreover, it is acceptable to form a fuel cell stack in which a plurality of membrane electrode assemblies (MEAs) 80 are layered and connected in series with separators 70 disposed therebetween so that the fuel cell can yield the desired voltage. There is no particular limitation upon the shape of the fuel cell, and the shape may be determined as appropriate so that the desired cell properties, such as voltage, can be obtained.

Figure 4:
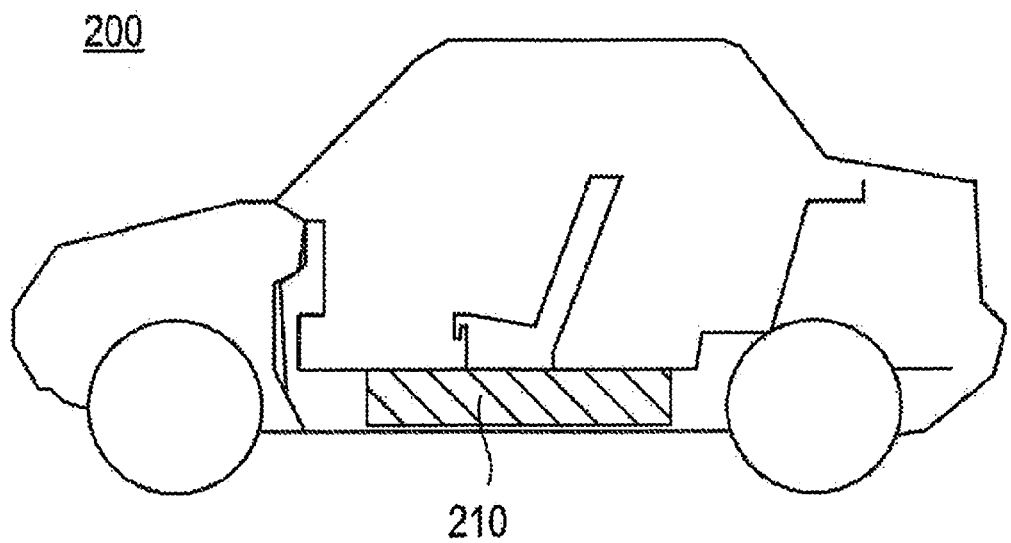
FIG. 4 is a perspective view of a vehicle equipped with a fuel cell stack.

The fuel cell 10 according to the present embodiment and a fuel cell stack using the same can be installed, for example, in an automobile as a drive power source. As shown in FIG. 4, to install a fuel cell stack 210 in an automobile such as a fuel cell vehicle 200, the stack may be installed, for example, under the seats in the center of the body of the fuel cell vehicle 200. Disposing the stack underneath the seats allows for more room in the vehicle interior and the trunk. In some instances, the location at which the fuel cell stack 210 is not limited to beneath the seats; for example, it may be installed beneath the rear trunk space, or the engine space at the front of the vehicle. Because the fuel cell 10 and the fuel cell stack 210 described above have superior output properties and durability, it is possible to provide a fuel cell-equipped vehicle of high long-term reliability.

EXAMPLES

The effects of the gas diffusion layer with flowpaths described above will now be described in detail using the example and comparative examples described below, but the present invention is not limited to the examples given below.

Example 1

Wires A' (polyester; 75 denier/24 filaments; twist rate: 1,000 t/m; diameter: approx. 150 µm) with surfaces coated with fusable resin and wires C' (polyester: 25 denier monofilament; diameter: 50 µm) were prepared. The wires C' were arranged in a 200 mesh (pitch between wires C': approx. 75 µm) to produce a substrate B'. The wires A' were arranged in a 65 mesh (pitch between wires A': approx. 200 µm) on the substrate B' so as to be orthogonal to but not interwoven with the wires C'. Afterwards, the whole was heated to at least 1,00° C. to melt the resin, thereby producing a substrate B' with wires A' in which the wires A' and the wires C' were orthogonal to but not interwoven with each other. Next, the surface of the substrate B' with wires A' was subjected to palladium electroless plating (weight: approx. 1 g/m²) and gold electroplating (thickness: approx. 20 nm) to impart electron conductivity, thereby producing a gas diffusion layer with flowpaths (flow-channel comprising GDL). In the gas diffusion layer with flowpaths, the gaps between adjacent electroconductive wires A function as flow channels for oxygen or hydrogen when power is being generated using the fuel cell, and the electroconductive wires A arranged in rows preserve the shapes of the flow channels and function as a gas diffusion layer. The gas diffusion layer with flowpaths was cut to a rectangular shape of dimensions width 50 mm×length 50 mm, and the perpendicularly cut ends of the wires A were observed. As a result, the thickness of the gas diffusion layer with flowpaths was 130-135 µm, the height of the electroconductive wires A was roughly 100 µm, and the pitch (P1) between adjacent electroconductive wires A 60 was roughly 200 µm, showing that the desired flow channel structure had been formed.

Next, a catalyst layer comprising platinum-carrying carrying was applied to both sides of an electrolyte membrane (DuPont; polymer electrolyte membrane Nafion 211) to produce a CCM. The catalyst layer had a rectangular shape of width 49 mm×50 mm. That is, the aspect ratio was roughly 1.

Next, a set of smooth separators (graphite) not comprising flow channel grooves, a set of current collector plates (copper), and a set of end plates (SUS) were prepared. The smooth separators were provided with pool-shaped recessions of dimensions width 50 mm×length 50 mm×depth 100 µm to fit the gas diffusion layer with flowpaths into. The smooth separators were provided with manifolds of dimensions width 50 mm×length 4 mm×depth 5 mm contacting two opposing lengthwise directional ends. In addition, the right ends or left ends of the manifolds were each provided with one gas supply hole (diameter: 3 mm) provided so as to demonstrate point symmetry with respect to the centers of the pool-shaped recessions. A seal groove for receiving a compressive rubber seal was also provided around the periphery of the pool-shaped recessions and pair of manifolds. The width of the seal groove was 2 mm, and the offset distance from the periphery of the rectangle groove and pair of manifolds to the seal groove was 1 mm.

Figure 5:
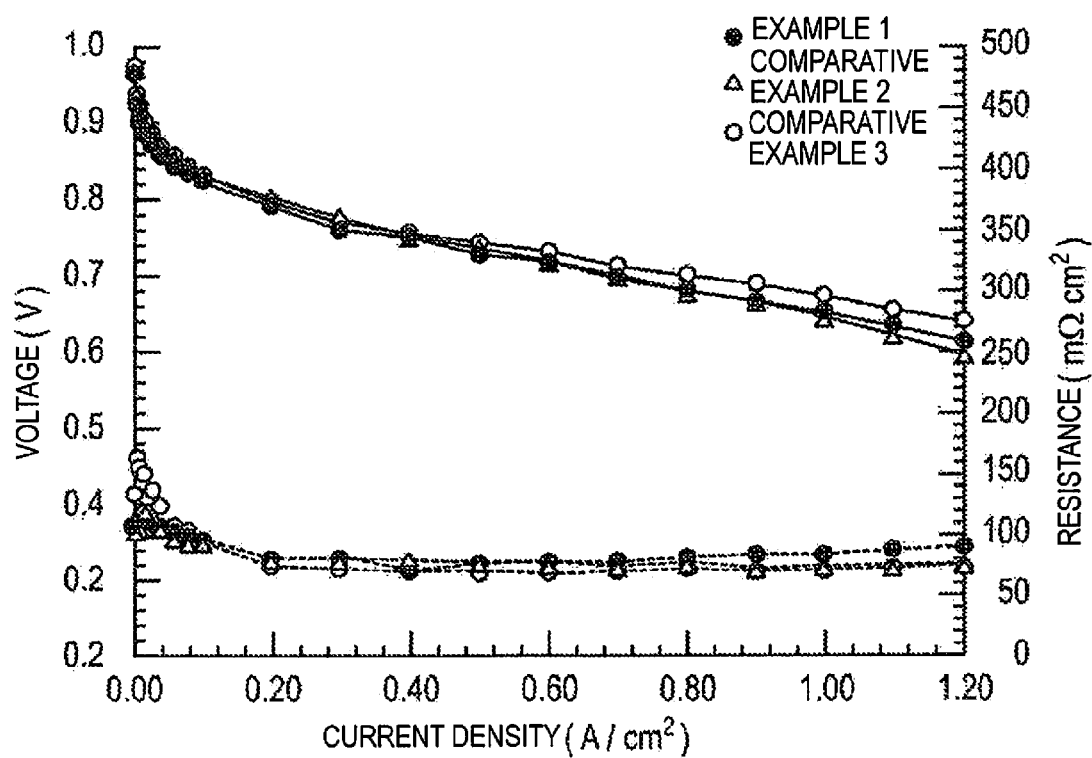
FIG. 5 is a graph showing power generation evaluation results for sub-scale fuel individual cells manufactured according to an example 1 and comparative examples 1 and 2.

The parts listed above were layered in the order end plate (cathode), current collector plate, separator, gas diffusion layer with flowpaths, CCM, gas diffusion layer with flowpaths, separator, current collector plate, end plate (anode) to form a sub-scale individual fuel cell. The electroconductive substrates B of the respective gas diffusion layer with flowpaths were disposed so as to contact the catalyst layer of the CCMs. Rubber heaters were placed tightly against the surfaces of the end plates and adjusted to 800° C., after which power generation was evaluated according to the following conditions. Specifically, the cell was operated at stoichiometric ratios of 1.5 (anode) and 2.0 (cathode), gas inlet relative humidities of anode: 40% RH and cathode: 70% RH, an operating pressure of 200 kPa (absolute pressure), and a current density of 1.2 A/cm². Results are shown in FIG. 5.

The sub-scale individual fuel cell according to example 1 successfully operated at a stable voltage of 0.62 V, despite the separators not being provided with a flow channel, as in the case of a known fuel cell. The distance between separators (individual fuel cell thickness) was 290 μm.

The wires C' (polyester; 25 denier monofilaments; diameter: 50 μm) were arranged in rows in a 200 mesh (pitch between wires C': approx. 75 μm) to produce a substrate B'. Next, the surface of the substrate B' was subjected to palladium electroless plating (weight: approx. 1 g/m²), then gold electroplating (thickness: approx. 20 nm) to produce an electroconductive substrate B. Measuring the penetrative resistance and Gurley density of the obtained electroconductive substrate B resulted in 30 mΩ/cm² or less and 300 seconds or less, respectively.

Comparative Example 1

A sub-scale individual fuel cell was produced according to the same method as example 1, except that conventional gas diffusion layers not comprising flow channels were used instead of the gas diffusion layer with flowpaths used in example 1 and a plain-weave mesh (thickness: 100 μm) of wires C' was used, and the power generation thereof was evaluated.

However, because neither the separators nor the gas diffusion layers of the sub-scale individual fuel cell according to comparative example 1 possess flow channel functionality for admitting sufficient oxygen or hydrogen when generating power using the individual fuel cell, pressure loss was excessive, and power generation could not be evaluated. The distance between separators (individual fuel cell thickness) was 230 μm.

Comparative Example 2

In lieu of the gas diffusion layer with flowpaths used in example 1, pieces of Toray Industries TGP-H-060 carbon paper (thickness: 200 μm) cut to width 50 mm and length 50 mm were used as conventional gas diffusion layers not comprising flow channels. Also, instead of smooth separators not comprising flow channel grooves, flow channel-comprising separators (graphite) provided with serpentine flow channels having a flow channel height of 1 mm, a rib width of 1 mm, a channel width of 1 mm, a rib pitch 2 mm, a flow channel direction length of 50 mm, and a width direction length of 50 mm were used. Apart from these points, a sub-scale individual fuel cell was produced according to a method similar to that used in example 1, and the power generation thereof was evaluated. Results are shown in FIG. 5.

The power generation of the sub-scale individual fuel cell according to comparative example 2 could be evaluated thanks to the separators being provided with flow channels; the voltage was 0.60 V. The distance between separators (individual fuel cell thickness) was 2,430 μm.

Comparative Example 3

In lieu of the gas diffusion layer with flowpaths used in example 1, pieces of Toray Industries TGP-H-060 carbon paper (thickness: 200 μm) cut to width 50 mm and length 50 mm were used as conventional gas diffusion layers not comprising flow channels. Also, instead of smooth separators not comprising flow channel grooves, flow-channel comprising separators (graphite) provided with straight flow channels having a flow channel height of 100 μm, a rib width of 150 μm, a channel width of 250 μm, a rib pitch of 400 μm, a flow channel direction length of 50 mm, and a width direction length of 50 mm were used. Apart from these points, a sub-scale individual fuel cell was produced according to a method similar to that used in example 1, and the power generation thereof was evaluated. Results are shown in FIG. 5.

The power generation of the sub-scale individual fuel cell according to comparative example 3 could be evaluated thanks to the separators being provided with flow channels; the voltage was 0.64 V. The distance between separators (individual fuel cell thickness) was 630 μm.

It is apparent from the results shown in FIG. 5 that the power generation properties of the fuel cell according to example 1, which comprised gas diffusion layer with flowpaths, yielded voltage comparable to or better than that yielded by the power generation properties of the ordinary fuel cells, which used separators comprising flow channels and gas diffusion layers not comprising flow channels.

Meanwhile, a comparison of example 1 and comparative example 3 shows that, whereas example 1 had an output of 0.62 V×1.2 A/cm²=0.744 W/cm², comparative example 3 had a comparable output of 0.64 V×1.2/cm²=0.768 W/cm². However, whereas the distance between separators (individual fuel cell thickness) was 290 μm in example 1, the distance between separators (individual fuel cell thickness) was 630 μm in comparative example 3. Taken as a whole, these results show that 2.1 times the output can be extracted from the same distance between separators by using the gas diffusion layer with flowpaths. In other words, the gas diffusion layer with flowpaths can be advantageously used, for example, in automotive fuel cell applications or the like, where there is a strong demand for reduced size and increased output.

The invention claimed is:

1. A gas diffusion layer with flowpaths, comprising:
  an electroconductive substrate; and
  electroconductive wires disposed on the electroconductive substrate, the electroconductive wires forming flow channels,
  the flow channels formed by the electroconductive wires have a height of 300 μm or less,
  the flow channels formed by adjacent electroconductive wires of the electroconductive wires have an equivalent diameter of 300 μm or less, and
  the electroconductive substrate has one layer of electroconductive wires orthogonal to but not interwoven with the electroconductive wires.

2. The gas diffusion layer with flowpaths according to claim 1, further comprising
  in a case where a catalyst layer disposed on a side of the electroconductive substrate opposite a side on which the electroconductive wires are disposed, the pitch between adjacent electroconductive wires satisfying the following formula (1):

[Numerical formula 1]

$$\rho \times r/t \leq 5 \qquad (1)$$

ρ being the resistivity (Ω·cm) of the catalyst layer, r being half the value of the pitch between adjacent electroconductive wires C, and t being the thickness of the catalyst layer.

3. The gas diffusion layer with flowpaths according to claim 1, wherein
  the electroconductive wires are formed from a non-electroconductive core material and an electroconductive surface layer material coating the non-electroconductive core material, or from a metal.

4. The gas diffusion layer with flowpaths according to claim 1, further comprising
an electroconductive particle layer disposed on a side of the electroconductive substrate opposite a side on which the electroconductive wires are disposed.

5. The gas diffusion layer with flowpaths according to claim 1, wherein
the gas diffusion layer with flowpaths has a rectangular shape such that L/W is 2 or less, L being the length in a direction parallel to the electroconductive wires and W being the length in a direction perpendicular to the electroconductive wires.

6. A fuel cell comprising:
a layered body including a membrane electrode assembly layer and a separator layer, the membrane electrode assembly layer having an anode electrode layer and a cathode electrode layer disposed on either side of an electrolyte membrane; and
the gas diffusion layer with flowpaths according to claim 1 disposed between the separator layer and the electrode layer of the membrane electrode assembly layer adjacent at least one of the anode electrode layer and the cathode electrode layer,
electrical contact being established between the electroconductive wires and the separator, and between the electroconductive substrate and the electrode layer of the membrane electrode assembly layer.

7. The gas diffusion layer with flowpaths according to claim 1, wherein
the electroconductive wires are formed from a non-electroconductive core material and an electroconductive surface layer material coating the non-electroconductive core material, or from a metal.

8. The gas diffusion layer with flowpaths according to claim 2, wherein
the electroconductive wires are formed from a non-electroconductive core material and an electroconductive surface layer material coating the non-electroconductive core material, or from a metal.

9. The gas diffusion layer with flowpaths according to claim 2, further comprising
an electroconductive particle layer disposed on a side of the electroconductive substrate opposite a side on which the electroconductive wires are disposed.

10. The gas diffusion layer with flowpaths according to claim 3, further comprising
an electroconductive particle layer disposed on a side of the electroconductive substrate opposite a side on which the electroconductive wires are disposed.

11. The gas diffusion layer with flowpaths according to claim 4, wherein
the gas diffusion layer with flowpaths has a rectangular shape such that L/W is 2 or less, L being the length in a direction parallel to the electroconductive wires and W being the length in a direction perpendicular to the electroconductive wires.

12. A fuel cell comprising:
a layered body including a membrane electrode assembly layer and a separator layer, the membrane electrode assembly layer having an anode electrode layer and a cathode electrode layer disposed on either side of an electrolyte membrane; and
the gas diffusion layer with flowpaths according to claim 4 disposed between the separator layer and the electrode layer of the membrane electrode assembly layer adjacent at least one of the anode electrode layer and the cathode electrode layer,
electrical contact being established between the electroconductive wires and the separator, and between the electroconductive substrate and the electrode layer of the membrane electrode assembly layer.

13. A fuel cell comprising:
a layered body including a membrane electrode assembly layer and a separator layer, the membrane electrode assembly layer having an anode electrode layer and a cathode electrode layer disposed on either side of an electrolyte membrane; and
the gas diffusion layer with flowpaths according to claim 5 disposed between the separator layer and the electrode layer of the membrane electrode assembly layer adjacent at least one of the anode electrode layer and the cathode electrode layer,
electrical contact being established between the electroconductive wires and the separator, and between the electroconductive substrate and the electrode layer of the membrane electrode assembly layer.

14. The gas diffusion layer with flowpaths according to claim 1, wherein
the electroconductive substrate is in direct contact with a catalyst layer.

* * * * *